(12) United States Patent
Tsai et al.

(10) Patent No.: US 6,313,230 B1
(45) Date of Patent: Nov. 6, 2001

(54) CATALYST COMPOSITION FOR HYDROGENATION OF CONJUGATED DIENE BASED SYNTHETIC RUBBERS

(75) Inventors: Jing-Cherng Tsai, Hsinchu; Wen-Sheng Chang, Miaoli; Yu-Shan Chao, Hsinchu; Chih-Nan Chu, Tainan; Chen-Pao Huang, Tainan; Hung-Yang Hsiao, Tainan, all of (TW)

(73) Assignees: Industrial Technology Research Institute, Hsinchu; Chi Mei Corporation, Tainan County, both of (TW)

( * ) Notice: Subject to any disclaimer, the term of this patent is extended or adjusted under 35 U.S.C. 154(b) by 0 days.

(21) Appl. No.: 09/400,544

(22) Filed: Sep. 21, 1999

(51) Int. Cl.[7] ........................................ C08F 8/04
(52) U.S. Cl. .................. 525/338; 525/332.8; 525/332.9; 525/333.2; 525/339
(58) Field of Search ...................... 525/338, 339

(56) References Cited

U.S. PATENT DOCUMENTS

| | | | |
|---|---|---|---|
| 5,132,372 | * 7/1992 | Chamberlain et al. | 525/338 |
| 5,244,980 | * 9/1993 | Gibler et al. | 525/338 |
| 5,583,185 | * 12/1996 | Parellada Ferrer et al. | 525/338 |
| 5,886,107 | * 3/1999 | De Boer et al. | 525/338 |
| 6,040,390 | * 3/2000 | Ko et al. | 525/338 |
| 6,228,952 | * 5/2001 | Viola et al. | 525/338 |

* cited by examiner

*Primary Examiner*—Bernard Lipman
(74) *Attorney, Agent, or Firm*—Sughrue, Mion, Zinn, Macpeak & Seas, PLLC

(57) ABSTRACT

A process for hydrogenation of conjugated diene polymers comprises hydrogenating said polymer in the presence of hydrogen and a hydrogenation catalyst composition comprising:

(a) at least one titanium compound represented by the following formula (a):

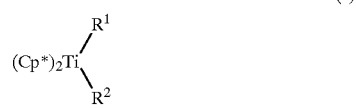

(a)

wherein $R^1$ and $R^2$, which may be the same or different, represent a halogen atom, an alkyl group, an aryl group, an arakyl group, a cycloalkyl group, an aryloxy group, an alkoxy group or a carbonyl group, and Cp* represents a cyclopentadienyl group or a derivative having the formula of $C_5R_5$, and $R_5$, which may be the same or different, represents a hydrogen atom, an alkyl group an aralkyl group and an aryl group; and (b) at least one silyl hydride.

15 Claims, No Drawings

CATALYST COMPOSITION FOR HYDROGENATION OF CONJUGATED DIENE BASED SYNTHETIC RUBBERS

FIELD OF THE INVENTION

The present invention relates to an improved catalyst composition for the hydrogenation of conjugated diene polymers, prepared by polymerization or copolymerization of conjugated diene monomers (eg. butadiene or isoprene). More specially, the present invention relates to a catalyst composition for hydrogenation of conjugated diene polymers with good activity, high selectivity and with lower cost.

This invention relates to a catalyst composition and a process for hydrogenation of conjugated diene polymers derived from the polymerization or co-polymerization of conjugated diene monomers to improve the polymer's weather resistance, heat resistance and oxidation resistance.

BACKGROUND OF THE INVENTION

The utilization of conjugated dienes (eg. butadiene, isoprene) in polymerization or co-polymerization reactions for preparing synthetic rubbers has been widely used in industry for commercial production. Basically, these polymers can be prepared by using either emulsion (free radical polymerization) or solution (anionic polymerization) processes. Both processes give conjugated diene polymers (copolymers) containing unsaturated double bonds in the polymer backbone. These unsaturated double bonds can be further utilized for vulcanization to improve the toughness of the material. However, the fact that these unsaturated double bonds are vulnerable toward oxidation caused disadvantages of the material in their lack of stability at elevated temperature or under weathering (exposure to ozone). Particularly, styrene-conjugated diene block copolymers (eg. SBS, SIS), which are used in their unvulcanized state as thermoplastic elastomers, impact-resistanit modifiers and compounding additives, have been recognized for their need to improve their deficiency in thermal and weathering stability.

This deficiency in thermal and weathering stability can be improved by removing or reducing the unsaturated double bonds in the polymer chain. Thereby, a more stable material can be prepared by hydrogenation of the olefinic unsaturated double bonds to give polymers with nearly an aliphatic structure. Technically, the reduction of unsaturated double bonds can be achieved by using either heterogeneous or homogeneous catalysts. In general, heterogeneous catalyst shows much lower hydrogenation reactivity, thereby a higher reaction temperature, a higher reaction pressure and a larger quantity of heterogeneous catalyst are used in the process. Thereby, the process is economically not favorable. In addition to the above problem, the severe reaction conditions also results in the hydrogenation of not only the targeted olefinic double bonds but also hydrogenation of the aromatic double bonds. Consequently, the reaction leads to the production of an undesired polymer structure which contains undesired partial cyclohexyl structure (derived from hydrogenation of the benzene ring in the polymer backbone) and has undesired semi-crystalline properties. Therefore, it has been strongly desired in industry for development of a homogeneouls catalyst system that can be used for hydrogenation of conjugated diene polymers with high activity and high selectivity (without hydrogenation of the aromatic double bonds).

An effective homogeneous hydrogenation reaction is known using bis (cyclopentadienyl) titanium compounds as the reaction catalyst, (as disclosed by M. F. Sloan et al. in the *Journal of American Chemical Society* 1965, 85, 4014–4018, by Y. Tajima, et al. in the *Journal of Organic Chemistry*, 1968, 33, 1689–1690, in British patent 2,134,909 and in Japanese patent 61,28507). The catalyst system shows good activity and excellent selectivity for hydrogenation of the olefinic double bonds. however, because of the lack of stability of the catalyst system, the reaction can be hardly reproducible.

In 1985, Kishimoto et al. disclosed (in U.S. Pat. No. 4,501,857) the hydrogenation of the olefinic double bonds in the presence of at least one bis(cyclopentadienyl) titanium compound and at least one hydrocarbon lithium compound wherein the hydrocarbon lithium compound can be used in combination with the anionic living chain end. In 1987, Kishimoto et al. also disclosed (in U.S. Pat. No. 4,673,714) the usage of bis(cyclopentadienyl) titanium diaryl compounds for hydrogenation of conjugated diene based polymers that do not require the addition of alkyl lithium compounds. Both processes described above involve using a high concentration of bis(cyclopentadienyl) titanium compounds as a catalyst, and hence is not economically favorable. In 1990, Teramoto et al. revealed (in U.S. Pat. No. 4,980,421) that a similar hydrogenation activity can be achieved by using the same titanium compound in combination with an alkoxy compound. In 1991, Chamberlain et al. revealed (in U.S. Pat. No. 5,039,755) a process of using hydrogen gas to terminate the living chain followed by adding bis(cyclopentadienyl) titanium compounds to cause the hydrogenation reaction to proceed. The problem of the process described above is that hydrogen gas is not very effective for the termination of the living chain end, thereby the hydrogenation reaction is hardly reproducible. In 1992, Chamberlain et al revealed (both in U.S. Pat. Nos. 5,132,372 and 5,173,537) similar hydrogenation processes by using hydrogen gas to terminate the living chain end followed by adding bis(cyclopentadienyl) titanium compounds as well as an additional catalyst promoter (methyl benzoate) for effective hydrogenation of conjugated diene polymers.

All of the catalyst compositions described above involve using alkyl lithium (lithium hydride generated statics in situ) or alkoxy lithium compounds to activate the bis (cyclopentadienyl) titanium catalyst for effective hydrogenation of the conjugated diene polymers. It should be noted that in the presence of lithium species can also induce the reduction of the bis(cyclopentadicnyl) titanium compounds from Ti (IV) to Ti (III), resulting in the decomposition of the catalyst component as well as reduction of the catalyst activity and stability. Therefore, from economic considerations, it is highly desirable to develop a catalyst composition which can prevent the decomposition of the reactive catalyst species, bis(cyclopentadienyl) titanium compounds, and providing stable and effective hydrogenation results by using minimum amount of the catalyst species.

SUMMARY OF THE INVENTION

An object of the invention is to provide a catalyst composition for hydrogenation of conjugated diene polymers with high hydrogenation activity and selectivity. Another object of the present invention is to provide a catalyst composition for the hydrogenation of conjugated diene polymers with good activity, high selectivity and with minimum amounts of catalyst component.

Still another object is to provide a process for hydrogenating conjugated diene polymers with higher hydrogenation activity and selectivity in the absence of a hydrocarbon lithium compound.

The catalyst composition of the present invention comprises:

(a) at least one titanium compound represented by the following formula (a):

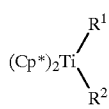

(a)

wherein $R^1$ and $R^2$, which may be the same or different, represent a halogen atom, an alkyl group, an aryl group, an arakyl group, a cycloalkyl group, an aryloxy group, an alkoxy group or a carbonyl group, and Cp* represents a cyclopentadienyl group or a derivative having the formula of $C_5R_5$, and $R_5$, which may be the same or different, represents a hydrogen atom, an alkyl group, an aralkyl group and an aryl group, (b) at least one silyl hydride selected from the group consisting of (i) a monomeric silyl hydride represented by the following formula (i):

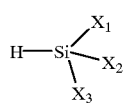

(i)

wherein $X_1$, $X_2$ and $X_3$, which may be the same or different, represent a hydrogen atom, a halogen atom, an alkyl group, an aryl group, an aralkyl group, a cycloalkyl group, an aryloxy group, an alkoxy group, an acyloxy group or a carboxylate group, (ii) a polymeric silyl hydride represented by the following formula (ii):

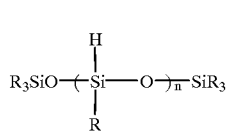

(ii)

wherein R represent a hydrogen atom, a halogen atom, an alkyl group, an aryl group, an aralkyl group, a cycloalkyl group, an aryloxy group or an alkoxy group and $n \geq 0$, (iii) a cyclic silyl hydride represented by the following, formula (iii):

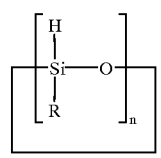

(iii)

wherein R represent a hydrogen atom, a halogen atom, an alkyl group, an aryl group, an aralkyl group, a cycloalkyl group, an aryloxy group or an alkoxy group and n=2, 3, 4 or 5, and (iv) a silazan represented by the following formula (iv) or (v):

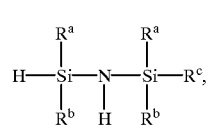

(iv)

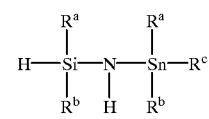

(v)

wherein, $R^a$, $R^b$, $R^c$, which may be the same or different, represent a hydrogen atom, a halogen atom, an alkyl group, an aryl group, an aralkyl group, a cycloalkyl group, an aryloxy group or an alkoxy group; and optionally (c) at least one metallic compound selected from the group consisting of an organoaluminum compound, an organomagnesium compound, an organolitlhium compound, an organozinic compound, a lithium hydride and $LiOR^3$, wherein $R^3$ represents an alkyl group, an aryl group, an aralkyl group or a cycloalkyl group.

One of the advantages of the catalyst composition of the present invention is that the catalyst composition shows much higher reactivity toward the hydrogenation of olefinic double bonds. Therefore, the total amounts of the titanium species added in the reaction can be reduced, and hence providing an economically favorable reaction process. Another advantage of the catalyst composition of the present invention is that the improvement of the stability of the catalyst system to give high conversion and high selectivity on the olefinic double bonds of the conjugated diene polymer.

DETAILED DESCRIPTION OF THE PREFERRED EMBODIMENT

The present invention provides a catalyst composition for hydrogenation of conjugated diene polymers with high reactivity, selectivity and stability. The catalyst composition disclosed in the present invention allows the use of a commercial available ingredient (silyl hydride species) to improve the catalyst stability, catalyst activity and turn over ratio. Consequently, the total amounts of the catalyst ingredients are reduced and hence reducing the production cost of the hydrogenation process.

The process of the present invention for hydrogenation of conjugated diene polymers comprises hydrogenating the polymer in the presence of hydrogen and a hydrogenation catalyst composition comprising:

(a) at least one titanium compound represented by the following formula (a):

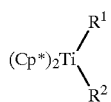 (a)

wherein $R^1$ and $R^2$, which may be the same or different, represent a halogen atom, an alkyl group, an aryl group, an arakyl group, a cycloalkyl group, an aryloxy group, an alkoxy group or a carbonyl group, and Cp* represents a cyclopentadienyl group or a derivative having the formula of $C_5R_5$, and $R_5$, which may be the same or different, represents a hydrogen atom, an alkyl group, an aralkyl group and an aryl group;

(b) at least one silyl hydride selected from the group consisting of
(i) a monomeric silyl hydride represented by the following formula (i):

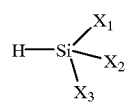 (i)

wherein $X_1$, $X_2$ and $X_3$, which may be the same or different, represent a hydrogen atom, a halogen atom, an alkyl group, an aryl group, a aralkyl group, a cycloalkyl group, an aryloxy group, an alkoxy group, an acyloxy group or a carboxylate group, (ii) a polymeric silyl hydride represented by the following formula (ii):

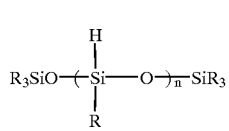 (ii)

wherein R represent a hydrogen atom, a halogen atom, an alkyl group, an aryl group, an aralkyl group, a cycloalkyl group, an aryloxy group or an alkoxy group and $n \geq 0$, (iii) a cyrclic silyl hydride represented by the following formula (iii):

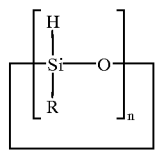 (iii)

wherein R represent a hydrogen atom, a halogen atom, an alkyl group, an aryl group, an aralkyl group, a cycloalkyl group, an aryloxy group or an alkoxy group and n=2, 3, 4 or 5, and (iv) a silazan represented by the following formula (iv) or (v):

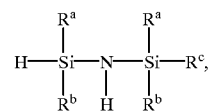 (iv)

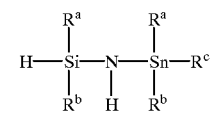 (v)

wherein, $R^a$, $R^b$, $R^c$, which may be the same or different, represent a hydrogen atom, a halogen atom, an alkyl group, an aryl group, an aralkyl group, a cycloalkyl group, an aryloxy group or an alkoxy group; and optionally (c) at least one metallic compound selected from the group consisting of an organoaluminium compound, an organomagnesium compound, an organolithium compound, an organozinc compound, a lithium hydride and $LiOR^3$, wherein $R^3$ represents an alkyl group, an aryl group, an aralkyl group or a cycloalkyl group.

The Cp* in the formula (a) represents a cyclopentadienyl group or a derivative, $C_5R_5$ and $R_5$, which may be the same or different, represents a hydrogen atom, an alkl group, an aralkyl group and an aryl group. Examples of suitable Cp* are cyclopentadienyl, and pentamethylcyclopentadienyl. From industrial availability, it is preferred to use cyclopentadienyl as Cp*.

Examples of suitable titanium compounds of formula (a) are bis(cyclopentadienyl) titanium dichloride, bis(cyclopentadienyl) titanium dibromide, bis(cyclopentadienyl) titanium diiodide, bis(cyclopentadienyl) titanium difluoride, bis(cyclopentadienyl) titanium dicarbonyl, bis(cyclopentadienyl) titanium dimethyl, bis(cyclopentadienyl) titanium diethyl, bis(cyclopeiitadienyl) titanium dipropyl (including isopropyl), bis(cyclopentadienyl) titanium dibutyl (including n-butyl, sec-butyl, tert-butyl), bis(cyclopentadienyl) titanium dibenzyl, bis(cyclopentadienyl) titanium diphenyl, bis(cyclopentadienyl) titanium dimethoxide, bis(cyclopentadienyl) titanium diethoxide, bis(cyclopentadienyl) titanium dipropoxide, bis(cyclopentadienyl) titanium dibutoxide, bis(cyclopentadieniyl) titanium diphenoxide, bis(cyclopentadienyl) titanium methyl chloride, bis(cyclopentadienyl) titanium methyl bromide, bis(cyclopentadienyl) titanium methyl iodide, bis(cyclopentadienyl) titanium methyl fluoride, bis(pentamethylcyclopentadienyl) titanium dichloride, bis(pentamethylcyclopentadienyl) titanium dibromide, bis(pentamethylcyclopentadienyl) titanium diuodide, bis(pentamethylcyclopentadienyl) titanium difluoride, bis(pentamethylcyclopentadienyl) titanium dicarbonyl, bis(pentametlhylcyclo-penitadieniyl) titanium dibutyl (including n-butyl, sec-butyl, tert-butyl), bis(pentamethylcyclopentadienyl) titanium dibenzyl, bis(pentametlhylcyclo-pentadieniyl) titanium diphenyl, and all mixtures thereof. The preferred titanium compound is bis(cyclopentadienyl) titanium dichloride because of ease of handling, air stability and commercial availability.

Examples of suitable monomeric silyl hydrides of formula (i) are methyl dichlorosilane, ethyl dichlorosilane, propyl dichlorosilane, butyl dichlorosilane, phenyl dichlorosilane, diimethyl chlorosilane, diethyl chlorosilane, dipropyl chlorosilane, dibutyl chlorosilane diphenyl chlorosilane, dimethyl methoxy silane, dimethyl ethoxy silane, dimethyl propoxy silane, dimethyl butoxy silane, dimethyl benzoxy silane, diethyl ethoxy silane, diethyl ethoxy silane, diethyl propoxy silane, diethyl butoxy silane, diethyl benzoxy silane, dipropyl methoxy silane, dipropyl ethoxy silane, dipropyl propoxy silane, dipropyl butoxy silane, dipropyl benzoxy silane, dibutyl methoxy silane, dibutyl ethoxy silane, dibutyl propoxy silane, dibutyl butoxy silane, dibutyl benzoxy silane, diphenyl methoxy silane, diphenyl ethoxy silane, diphenyl propoxy silane, diphenyl butoxy silane, dipheniyl benzoxy silane, dimethylsilane, diethylsilane, dipropyl silane, dibutylsilane, diphenylsilane, diphenylmethylsilane, diphenylethylsilane, diphenylpropylsilane, diphelnylbutylsilane, trimethylsilane, triethylsilane, tripropylsilane, tributylsilane, triphenylsilane, methylsilane, ethylsilane, propylsiiane, butylsilane, phenylsilane and methyldiacetoxysilane.

The value of n of formula (ii) is oreater or equal to 0. preferrably between 0 and 100.

Examples of suitable polymeric silyl hydrides of formula (ii) are polymethylhydrosiloxane, polyethylhydrosiloxane, polypropylhydrosiloxane, polybutylhydrosiloxane, polyphenyllhydrosiloxane, 1,1,3,3-tetramethyldisiloxane.

Examples of suitable cyclic silyl hydrides of formula (iii) are methylhydrocyclosiloxane, ethyllhydrocyclosiloxane, propylhydrocyclosiloxane, butylhydrocyclosiloxane, phenylhydrocyclosiloxane.

Examples of suitable silazans of formula (iv) are 1,1,3,3, tetramethyl disilazan, 1,1,3,3, tetraethyl disilazan. 1,1,3,3, tetrapropyl disilazan, 1,1,3,3, tetrabutyl disilazan, 1,1,3,3, tetraphenyl disilazal.

Examples of suitable organoaluminum compounds are trimethylaluminum, triethylaluminum, triisobutylaluminum triphenylaluminum, diethylaluminum chloride, ethylaluminumn dichlioride, methylaluminum sesquichloride, ethylaluminium sesquichloride, diethylaluminum hydride, diisobutylaluminum hydride, triphenylaluminum and tri(2-ethylhexyl)-aluminum.

Examples of suitable organomagnesium compounds are dimethylmagnesium, diethylmagnesium, methylmagnesium bromide, methylmagnesium chloride, ethylmagnesium bromide, ethylmagnesium chloride, phenylmagnesium bromide, phenylmagnesium chloride and dimethylmagniesium chloride.

Examples of suitable organozillc compounds are diethylzinc, bis(cyclopentadienyl)zinc and diphenylzinc.

Examples of suitable $LiOR^3$ compounds are methoxylithium, ethoxylithium, n-propoxylithium, i-propoxylithium, n-butoxylithium, sec-butoxylithium, t-butoxylithium, pentyloxylithium, hexyloxylithium, hetyloxylithium, octyloxylithium, phenoxylithium, 4-methylphenoxylithium, 2,6-di-t-butyl-4-methylphenoxylithium and benzyloxylithium.

Examples of the suitable organolithium compounds are n-propyllithium, isopropyllithium, n-butyllithium, sec-butyllithium, t-butyllithium, n-pentyllithium, benzyllithium, dilithium compounds, such as 1,4-dilithio-n-butane, and anionic living polymers having active lithiums in the polymer chain.

The lithium hydride of the present invention can be used in its original form or it can be generated under statics in situ conditions, i.e. the living conjugated diene polymers having active lithium ends which is terminated with hydrogen gas. For the sake of good hydrogenation activity, statics in situ generated lithium hydride is preferable.

Even in the absence of the metallic compounds (c), that is, only titanium compounds (a) and silyl hydride (b) are used, the catalyst composition, still shows good hydrogenation activity and selectivity.

The molar ratio of silyl hydride (b) to titanium compounds (a) may be 0.01/1 to 200/1, preferably 0.1/1 to 100/1. The silyl hydride (b) of the present invention improves the stability of the catalyst system to give high conversion and high selectivity on the olefinic double bonds with reproducible hydrogenation results. The stability of the catalyst composition with high hydrogenation activity may be due to the formation of the bis(cyclopentadieny) titanium silyl hydride complex of the following formula:

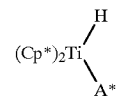

wherein A* is a silicone group which is derived from silyl hydride (b), such as

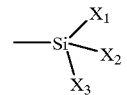

The metallic compounds (c) can further be used as an additional catalyst component of titanium compounds (a) and silyl hydride (b) for some other purposes, if necessary, such as relieving the adverse effect of the impurities of the conjugated diene polymers during hydrogenation. The polar compounds such as tetrahydrofuran, triethyl amine, N,N,N', N'-tetramethylethylenediamine and ethyleneglycoldimethylether may also be used as one of the additional catalyst component.

The molar ratio of metallic compounds (c) to titanium compounds (a) may be 0/1 to 100/1, preferably 0.5/1 to 25/1, more preferably 1/1 to 10/1. If the molar ratio (c)/(a) is higher than 100/1, it tends to induce gelation of the polymer and unwanted secondary reactions, and hence reduces the catalyst activity.

The catalyst composition of the present invention with the component molar ratio shown above shows much higher reactivity toward the hydrogenation of the olefinic double bonds. Therefore, the total amounts of the titanium species added in the reaction can be reduced, and hence an economically favorable reaction process is provided.

As is well known, conjugated diene polymers may be prepared using a radical or anionic catalyst. Such polymers may be prepared using bulk, solution or emulsion techniques. In general, when solution anionic techniques are used, conjugated diene polymers are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal compound in a suitable solvent at a temperature within the range from about −150° C. to about 300° C., preferably at a temperature within the range from about 0° C. to about 100° C.

The catalyst of this invention can be applied to all polymers having olefinically unsaturated double bonds. Preferably, the catalyst is applied to conjugated diene polymers. Such conjugated diene polymers include homopolymers of a conjugated diene, copolymers of different conjugated dienes and copolymers of at least one conjugated diene and at least one olefin monomer. The conjugated dienes used in the production of these conjugated diene polymers are generally those having 4 to about 12 carbon atoms. Specific examples thereof are 1,3-butadiene, isoprene, 2,3-dimethyl- 1,3-butadiene, 1,3-pentadiene, 2-methyl-1,3-pentadiene, 1,3-hexadiene and 4,5-diethyl-1, 3-butadiene, wherein 1,3-butadiene and isoprene are particularly preferred in view of advantages in industrial application and of excellent properties of elastomers obtained.

The catalyst of this invention can preferably be applied to hydrogenation of copolymers, which are prepared from the copolymerization of at least one conjugated diene and at least one olefin monomer. The preferable conjugated dienes used in production of such copolymers are those mentioned above. As the olefin monomers, all olefin monomers copolymerizable with said conjugated dienes may be used, and vinyl substituted aromatic hydrocarbons are particularly preferred. Specific examples of the vinyl-substituted aromatic hydrocarbons used in production of such coplymers include styrene, t-butylstyrene, α-methylstyrene, p-methylstyrene, divinylbenzene, 1,1-diphenylethylene, N,N-dimethyl-p-aminoethyletyrene, N,N-diethyl-p-aminoethylstyrene, etc. Of these, styrene is particularly preferred. Specific examples of the copolymers of a conjugated diene and a vinyl-substituted aromatic hydrocarbon include a butadiene/styrene copolymer and an isoprene/styrene copolymer, and these two copolymers are the most preferable because they provide hydrogenated copolymers of high industrial value.

The copolymers of a conjugated diene and a vinyl-substituted aromatic hydrocarbon include random copolymers wherein monomers are statistically distributed throughout the entire polymer chain, tapered block copolymer, complete block copolymers and graft copolymers. Of these, block copolymers are particularly preferred in order to allow the copolymers to exhibit the characteristics as thermoplastic elastomers useful in industry.

Such block copolymers are copolymers comprising (a) at least one polymer block A composed mainly of a vinyl-substituted aromatic hydrocarbon and (b) at least one polymer block B composed mainly of a conjugated diene. The block A may contain a slight amount of the conjugated diene and the block B may contain a slight amount of the vinyl-substituted aromatic hydrocarbon. The block copolymer includes not only linear type but also the so-called branched type, radial type and star type which are formed by coupling the linear block polymers with a coupling agent. Block copolymers preferably used in this invention are those containing 5% to to 95% by weight of a vinyl-substituted aromatic hydrocarbon. The microstructure of the conjugated diene unit of the block copolymer has a 1,2-vinyl content of 6%~80%, preferably 20%~70%. When block copolymers meeting these requirements are hydrogenated, their olefin portions having a good elasticity, and therefore, they are not only useful in industry, but also low in solution viscosity and hence easy to separate from the reaction solvents. Therefore, the hydrogenated block copolymers can be economically produced.

In general, the hydrogenation can be carried out in a suitable solvent at a temperature within the range of from about 0° C. to 120° C., preferably about 50° C. to about 90° C., and at a hydrogen partial pressure within the range from about 1 psig to about 1200 psig, preferably from about 100 to about 200 psig. Catalyst concentrations within the range from about 0.001 mM (milimoles) per 100 grams of polymer to about 20 mM per 100 grams of polymer, are generally used and contacting at hydrogenation conditions is generally continued for a period of time within the range from about 10 to about 360 minutes.

The catalyst components of the present invention can either be added into the solution of the conjugated diene polymer individually or with some of the catalyst components premixed in advance.

Reaction may be carried out in stirred-tank reactors or in loop-reactors in which the solution mixture to be hydrogenated is extracted from the reactor and circulated by means of a pump through a heat exchanger and reintroduced into the reactor where it is contacted with hydrogen. The reaction may be carried out in a continuous or batch-type operation. The catalyst of this invention may be added to the reaction medium as such, or in the form of a solution in an inert organic solvent of the above-mentioned type.

The hydrogenation process related to present invention can be conducted by bulk or solution processes. As in the solution process, inert solvents, which are used in the anionic polymerization process, can be used directly without additional purification process. Thereby, the present invention provides an easier reaction process, which uses the same reaction media to conduct both anionic polymerization and hydrogeneation processes. In general, any of the solvents known in the prior art to be useful in the preparation of conjugated diene polymers may be used. Suitable solvents include straight-chain heptane, octane and the like, as well as, their alkyl-substituted derivatives, and include cycloaliphatic hydrocarbons such as cyclopentane, cyclohexane, cycloheptane and their alkyl-substituted and aromatic-substituted derivatives, and include aromatic and alkyl-substituted aromatic hydrocarbons such as benzene, naphthalene, toluene, xylenc and their derivatives, and include hydrogenated aromatic hydrocarbons such as tetralin, decalin and their derivatives, and include linear and cyclic ethers such as dimethyl ether, methyl ethyl ether, diethyl ether, tetrahydrofuran and their derivatives can all be used as the reaction solvents in the processes.

After the hydrogenation reaction, the reaction solution can be quenched with an alcohol (e.g. methanol, ethanol or isopropanol) to precipitate the desired hydrogenation polymer. The resulting polymer product can then be collected by filtration and dried in vacuum to give the desired product in high purity. Noted that because of the high reactive nature of the invention catalyst system, only small amount of catalyst species is used in the hydrogenation reaction, thereby additional dashing process for removing catalyst component is not required.

The hydrogenation catalyst of this invention enables quantitative hydrogenation of olefinically unsaturated double bonds by proper selection of hydrogenation conditions. The catalyst further enables hydrogenation of such double bonds to a desired hydrogenation level. In the hydrogenation of conjugated diene polymers, a hydrogenation level of at least 50%, preferably at least 90% of the unsaturated double bonds of conjugated diene units can be obtained. In the case of a copolymer of a conjugated diene and a vinyl-substituted aromatic hydrocarbon, a hydrogenation level of at least 50%, preferably at least 90%, of the unsaturated double bonds of the conjugated diene units of the original copolymer and 10% or less, preferably 5% or less, of the double bonds of the aromatic portions of the original copolymer have been selectively hydrogenated.

The hydrogenation percentage of olefinically unsaturated double bonds can be determined from an infrared absorption spectrum. In the case of a polymer containing aromatic rings, an ultraviolet absorption spectrum, an NMR spectrum, or the like can be used in combination therewith.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

A. Preparation of Reaction Catalysts:

EXAMPLE 1

Hydrogenation reaction catalysts were prepared by the combination of dimethyl titanocene (a) with silyl hydride (b) of formula (i), (ii), (iii) and (iv) in an inert solvent (e.g. toluene or cyclohexane) to generate a light brown to brown solution. The resulting catalyst can be isolated by removing the volatiles and drying in vacuum.

Reaction components for the preparation of catalyst species are listed in the following table:

TABLE 1

Catalyst Component for the Preparation of Active Catalysts

| Cat. component Cat. Number | Titanocene compound (g; mmol) | Silyl hydride species (g; mmole) | Reaction solvent (ml) |
|---|---|---|---|
| 1 | Cp$_2$TiMe$_2$ (0.21 g; 1.0 mmol) | Phenyl silane (0.22 g; 2.0 mmol) | Cyclohexane (20 ml) |
| 2 | Cp$_2$TIMe$_2$ (0.21 g; 1.0 mmol) | 1,1,3,3-tetramethyl-disilazane (0.40 g; 3.0 mmol) | Toluene (20 ml) |
| 3 | Cp$_2$TIMe$_2$ (0.21 g; 1.0 mmol) | 1,1,3,3-tetramethyl disiloxane | Toluene (20 ml) |

TABLE 1-continued

Catalyst Component for the Preparation of Active Catalysts

| Cat. component Cat. Number | Titanocene compound (g; mmol) | Silyl hydride species (g; mmole) | Reaction solvent (ml) |
|---|---|---|---|
| | | (0.40 g; 3.0 mmol) | |
| 4 | Cp$_2$TiMe$_2$ (0.21 g; 1.0 mmol) | Methydiacetoxysilane (0.97 g; 6.0 mmol) | Toluene (20 ml) |
| 5 | Cp$_2$TiMe$_2$ (0.21 g; 1.0 mmol) | Methylhydrocyclosiloxane (0.36 g; 1.5 mmol[1]) | Toluene (20 ml) |
| 6 | Cp$_2$TiMe$_2$ (0.21 g; 1.0 mmol) | Polymethylhydrosiloxane[a] (0.48 g; 1.1 mmol[2]) | Toluene (20 ml) |
| 7 | Cp$_2$TiMe$_2$ (0.21 g; 1.0 mmol) | Polymethylhydrosiloxane[b] (0.48 g; 0.096 mmol[3]) | Toluene (20 ml) |

[1]Molecular weight of methylhydrocyclosiloxane = 240
[2]Molecular weight of Polymethylhydrosiloxane[a] = 420
[3]Molecular weight of Polymethylhydrosiloxane[b] = 5000

EXAMPLE 2

Hydrogenation reaction catalysts were prepared by statics in situ generation of active catalysts by adding a metallic compounds (c) (alkyl lithium or alkyl magnesium) into an inert solution containing titanocene dichloride (a) and a silyl hydride (b) of formula (i), (ii), (iii) and (iv). The reaction components are listed in the following table:

TABLE 2

Catalyst Component for the Preparation of Active Catalysts

| Cat. component Cat. Number | Metal alkyl (mmol) | Titanocene compound (g; mmol) | Silyl hydride species (g; mmole) | Reaction solvent (ml) |
|---|---|---|---|---|
| 8 | nBuli (6.0 mmol) | Cp$_2$TiCl$_2$ (0.25 g; 1.0nmiol) | Phenyl silane (0.22 g; 2.0 mmol) | Cyclohexane (20 ml) |
| 9 | EtMgBr (10.0 mmol) | Cp$_2$TiCl$_2$ (0.25 g; 1.0 mmol) | Phenyl silane (0.22 g; 2.0 mmol) | Cyclohexane (20 ml) |
| 10 | nBuli (10.0 mmol) | Cp$_2$TiCl$_2$ (0.25 g; 1.0 mmol) | 1,1,3,3-tetramethyl-disilazane(0.40 g; 3.0 mmol) | Toluene (20 ml) |
| 11 | nBuli (6.0 mmol) | Cp$_2$TiCl$_2$ (0.25 g; 1.0 mmol) | 1,1,3,3-tetramethyl-disiloxane(0.40 g; 3.0 mmol) | Toluene (20 ml) |
| 12 | EtMgBr (10.0 mmol) | Cp$_2$TiCl$_2$ (0.25 g; 1.0 mmol) | 1,1,3,3-tetramethyl-disiloxane(0.40 g; 3.0 mmol) | Toluene (20 ml) |
| 13 | nBuli (10.0 mmol) | Cp$_2$TiCl$_2$ (0.25 g; 1.0 mmol) | Methydiacetoxysilane (0.97 g; 6.0 mmol) | Toluene (20 ml) |
| 14 | nBuli (10.0 mmol) | Cp$_2$TiCl$_2$ (0.25 g; 1.0 mmol) | Methylhydrocyclosiloxane (0.36 g; 1.5 mmol[1]) | Toluene (20 ml) |
| | nBuli (10.0 mmol) | Cp$_2$TiCl$_2$ (0.25 g; 1.0 mmol) | Polymethylhydrosiloxane[a] (0.48 g; 1.1 mmol[2]) | Toluene (20 ml) |
| 16 | nBuli (0.0 mmol) | Cp$_2$TiCl$_2$ (0.25 g; 1.0 mmol) | Polymethylhydrosiloxane[b] (0.48 g; 0.096 mmol[3]) | Toluene (20 ml) |
| 17 | EtMgBr (12.0 mmol) | Cp$_2$TiCl$_2$ (0.25 g; 1.0 mmol) | Polymethylhydrosiloxane[a] (0.48 g; 1.1 mmol[2]) | Toluene (20 ml) |

[1]Molecular weight of methylhydrocyclosiloxane = 240
[2]Molecular weight of Polymethylhydrosiloxane[a] = 420
[3]Molecular weight of Polymethylhydrosiloxane[b] = 5000

B. Hydrogenation of Synthetic Rubbers

EXAMPLE 3

Catalyst components prepared in Example 1 were diluted in toluene or cyclohexane to form a 0.01M catalyst solution (based on Ti concentration). The resulting catalyst solutions were used directly for the hydrogenation of styrene butadiene styrene (SBS) polymer. SBS polymer, a linear block copolymer with a number average molecular weight of 100,000, was prepared by an anionic polymerization procedure followed by termination of the living chain end with isopropanol, and then filtration and drying under vacuum overnight. This SBS polymer was found to contain 30 wt % of styrene units and 70 wt % of butadiene units including 25 wt % of 1,2-vinyl structure. Then 15 g of the SBS polymer was dissolved in 125 ml of cyclohexanie. The resulting SBS/cyclohexane solution was used directly for hydrogenation. The hydrogenations of SBS polymer were conducted in a 500 ml autoclave under 200 psi of $H_2$ at 60° C. using cyclohexane as the reaction solvent. After maintaining the reaction at 60° C. under 200 psi of hydrogen for 60 minutes, the reaction solution was quenched with isopropanol. The resulting hydrogenated products were isolated after filtration and drying at 40° C. overnight. The total conversion of the olefinic double bonds was then analyzed by IR spectroscopy. The hydrogenation results were summarized in the following table.

TABLE 3

Hydrogenation of SBS Polymers Using Catalysts Prepared from Example 1

| Catalyst number (volume used) | Net Weight of Butadiene units (g) | Converstion of Butadiene unit (%) | Catalyst turn over ratio (mole Butadiene conversion per mole atalyst used) | Hydrogenation Selectivity* (%) |
|---|---|---|---|---|
| 1(1.2 ml) | 10.5 | 92 | 14900 | 99 |
| 2(1.2 ml) | 10.5 | 76 | 12300 | 99 |
| 3(1.2 ml) | 10.5 | 96 | 15500 | 99 |
| 4(1.2 ml) | 10.5 | 64 | 10300 | 99 |
| 5(1.2 ml) | 10.5 | 99 | 16000 | 99 |
| 6(1.2 ml) | 10.5 | 99 | 16000 | 99 |
| 7(1.2 ml) | 10.5 | 99 | 16000 | 99 |

* Hydrogenation selectivity was calculated by (mole of butadiene conversion) / (mole of butadiene conversion) + (mole of benzylic double bond conversion)

EXAMPLE 4

Catalyst components prepared in Example 2 were diluted in toluene or cyclohexane to form a 0.0M catalyst solution (based on Ti concentration). The resulting catalyst solutions were used directly for the hydrogenation of styrene butadiene styrene (SBS) polymer. The SBS polymer was the same as in Ex.3. The hydrogenation of SBS polymer were conducted in a 500 ml autoclave under 200 psi of $H_2$ at 60° C. with cyclohexane as the solvent. After maintaining the reaction at 60° C. under 200 psi of hydrogen for 60 minutes, the reaction solution was quenched with isopropanol. The resulting hydrogenated products were isolated after filtration and drying at 40° C. overnight. The total conversion of the olefinic double bonds was then analyzed by IR spectroscopy. The hydrogenation results were summarized in the following table.

TABLE 4

Hydrogenation of SBS Polymers Using Catalysts Prepared From Example 2

| Catalyst number (volume used) | Net Weight of Butadiene units (g) | Converstion of Butadiene unit (%) | Catalyst turn over ratio (mole Butadiene conversion per mole atalyst used) | Hydrogenation Selectivity* (%) |
|---|---|---|---|---|
| 8(1.2 ml) | 10.5 | 90 | 14600 | 99 |
| 9(1.2 ml) | 10.5 | 86 | 13900 | 99 |
| 10(1.2 ml) | 10.5 | 78 | 12700 | 99 |
| 11(1.2 ml) | 10.5 | 99 | 16000 | 99 |
| 12(1.2 ml) | 10.5 | 95 | 15400 | 99 |
| 13(1.2 ml) | 10.5 | 52 | 8400 | 99 |
| 14(1.2 ml) | 10.5 | 93 | 15100 | 99 |
| 15(1.2 ml) | 10.5 | 99 | 16000 | 99 |
| 15(0.8 ml) | 10.5 | 99 | 24100 | 99 |
| 16(1.2 ml) | 10.5 | 99 | 16000 | 99 |
| 17(1.2 ml) | 10.5 | 98 | 5900 | 99 |

* Hydrogenation selectivity was calculated by (mole of butadiene conversion) / (mole of butadiene conversion) + (mole of benzylic double bond conversion)

EXAMPLE 5

Hydrogenation reactions in Example 4 were repeated except that the SBS polymers prepared from anionic polymerization were used directly without further purification (SBS polymer solution still containing the living lithium chain end). The hydrogenation results were summarized in the following table.

TABLE 5

Hydrogenation of SBS Polymers with Living Anionic Chain End

| Catalyst number (volume used) | Net Weight of Butadiene units (g) | Converstion of Butadiene unit (%) | Catalyst turn over ratio (mole Butadiene conversion per mole catalyst used) | Hydrogenation Selectivity* (%) |
|---|---|---|---|---|
| 8(1.2 ml) | 8.75 | 90 | 12200 | 99 |
| 10(1.2 ml) | 8.75 | 99 | 13300 | 99 |
| 11(1.2 ml) | 8.75 | 94 | 12700 | 99 |
| 13(1.2 ml) | 8.75 | 84 | 11300 | 99 |
| 14(2 ml) | 8.75 | 91 | 12300 | 99 |
| 15(1.2 ml) | 875 | 99 | 13300 | 99 |
| 15(0.8) | 8.75 | 99 | 20100 | 99 |

*Hydrogenation selectivity was calculated by (mole of butadiene conversion) / (mole of butadiene conversion) + (mole of benzylic double bond conversion)

EXAMPLE 6

Hydrogenation reactions in Example 5 were repeated by using catalyst no. 14 as the catalyst except that different reaction temperature $H^2$ pressure and reaction time were used. The hydrogenation results were summarized in the following, table.

TABLE 6 using Catalyst 14 for the Hydrogenation of SBS

| Catalyst number (Volume used) | Net weight of Butadiene unit (g) | Reaction temp (° C.) | Reaction Pressure (psi) | Reaction time (min) | Conversion of Butadiene unit (%) | Catalyst turn over ratio | Hydrogenation Selectivity* (%) |
|---|---|---|---|---|---|---|---|
| 15 (1.2 ml) | 8.75 | 40 | 200 | 40 | 64 | 8600 | 99 |
| 15 (1.2 ml) | 8.75 | 40 | 200 | 80 | 99 | 13300 | 99 |
| 15 (1.2 ml) | 8.75 | 40 | 100 | 80 | 59 | 7780 | 99 |
| 15 (1.2 ml) | 8.75 | 40 | 100 | 180 | 99 | 13300 | 99 |
| 15 (1.2 ml) | 8.75 | 40 | 300 | 40 | 99 | 13300 | 99 |
| 15 (1.2 ml) | 8.75 | 40 | 400 | 25 | 99 | 13300 | 99 |
| 15 (1.2 ml) | 8.75 | 60 | 200 | 60 | 99 | 13300 | 99 |
| 15 (1.2 ml) | 8.75 | 60 | 100 | 90 | 99 | 13300 | 99 |

*Hydrogenation selectivity was calculated by (mole of butadiene conversion)/(mole of butadiene conversion) + (mole of benzylic double bond conversion)

COMPARATIVE EXAMPLE 1

Hydrogenation reaction in Example 3 was repeated excepted that $Cp_2Ti(Me)_2$ was used as the reaction catalyst. After mainlining the reaction at 60° C. under 200 psi of hydrogen for 60 minutes, the reaction solution was quenched with isopropanol. The resulting hydrogenated products were isolated after filtration and drying at 40° C. overnight. The total conversion of the olefinic double bonds was then analyzed by IR and was found to be 45% which is equal to a turn over ratio of 7250.

COMPARATIVE EXAMPLE 2

Hydrogenation reaction in Example 4 was repeated excepted that $Cp^2Ti(Cl)^2$ was used as the reaction catalyst. After maintaining the reaction at 60° C. under 200 psi of hydrogen for 60 minutes, the reaction solution was quenched with isopropanol. The resulting hydrogenated products were isolated after filtration and drying at 40° C. overnight. The total conversion of the olefinic double bonds was then analyzed by IR and was found to be 28% which is equal to a turn over ratio of 4500.

The foregoing description of the preferred embodiments of the invention has been presented for purposes of illustration and description. Obvious modifications or variations are possible in light of the above teaching. The embodiments were chosen and described to provide a good illustration of the this invention and its practical application to thereby enable those skilled in the art to utilize the invention in various embodiments and with various modifications as are suited to the particular use contemplated. All Such modifications and variations are within the scope of the present invention as determined by the appended claims when interpreted in accordance with the breadth to which they are fairly, legally, and equitably entitled.

What is claimed is:

1. A process for hydrogenation of conjugated diene polymers comprising hydrogenating said polymer in the presence of hydrogen and a hydrogenation catalyst composition comprising:

(a) at least one titanium compound represented by the following formula (a):

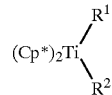

(a)

wherein $R^1$ and $R^2$, which may be the same or different, represent a halogen atom, an alkyl group, an aryl group, an arakyl group, a cycloalkyl group, an aryloxy group, an alkoxy group or a carbonyl group, and Cp* represents a cyclopentadienyl group or a derivative having the formula of $C_5R_5$, and $R_5$, which may be the same or different, represents a hydrogen atom, an alky group, an araikyl group and an aryl group;

(b) at least one silyl hydride selected from the group consisting of
  (i) a monomeric silyl hydride represented by the following formula (i):

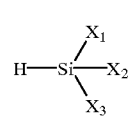

(i)

wherein $X_1$, $X_2$ and $X_3$, which may be the same or different, represent a hydrogen atom, a halogen atom, an alkyl group, an aryl group, an aralkyl group, a cycloalkyl group, an aryloxy group, an alkoxy group, an acyloxy group or a carboxylate group, (ii) a polymeric silyl hydride represented by the following formula (ii):

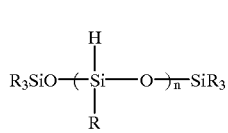

(ii)

wherein each R can be the same or different and is selected from the group consisting of a hydrogen atom, a halogen atom, an alkyl group, an aryl group, an aralkyl group, a cycloalkyl group, an aryloxy group and an alkoxy group and n≧0, (iii) a cyclic silyl hydride represented by the following formula (iii):

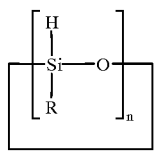

(iii)

wherein R represent a hydrogen atom, a halogen atom, an alkyl group, an aryl group, an aralkyl group, a cycloalkyl group, an aryloxy group or an alkoxy group and n=2, 3, 4 or 5, and (iv) a silazan represented by the following formula (iv):

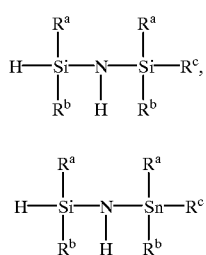

wherein, $R^a$, $R^b$, $R^c$, which may be The same or different, represent a hydrogen atom, a halogen atom, an alkyl group, an aryl group, an aralkyl group, a cycloalkyl group, an aryloxy group or an alkoxy group; and optionally (c) at least one metallic compound selected from the group consisting of an organoaluminum compound, an organomagnesium compound, an organolithium compound, an organozinc compound, a lithium hydride and $LiOR^3$, wherein $R^3$ represents an alkyl group, an aryl group, an aralkyl group or a cycloalkyl group.

2. A process according to claim 1, wherein said Cp* is cyclopentadienyl.

3. A process according to claim 1, wherein said titanium compounds are selected from the group consisting of bis(cyclopentadienyl) titanium dichloride, bis(cyclopentadienyl) titanium dibromide, bis(cyclopentadienyl) titanium duiodide, bis(cyclopentadienyl) titanium difluoride, bis(cyclopentadieniyl) titanium dicarbonyl, bis(cyclopentadienyl) titanium dimethyl, bis(cyclopentadienyl) titanium diethyl, bis(cyclopentadienyl) titanium dipropyl (including isopropyl), bis(cyclopentadienyl) titanium dibutyl (including n-butyl, sec-butyl, tert-butyl), bis(cyclopentadienyl) titanium dibenzyl, bis(cyclopentadienyl) titanium diphenyl, bis(cyclopentadienyl) titanium dimethoxide, bis(cyclopentadienyl) titanium diethoxide, bis(cyclopentadienyl) titanium dipropoxide, bis(cyclopentadienyl) titanium dibutoxide, bis(cyclopentadienyl) titanium diphenoxide, bis(cyclopentadienyl) titanium methyl chloride, bis(cyclopentadienyl) titanium methyl bromide, bis(cyclopentadienyl) titaniumn methyl iodide, bis(cyclopentadienyl) titanium methyl fluoride, and a mixture thereof.

4. A process according to claim 1, wherein the organlithium compound is selected from the group consisting of methyl lithium, ethyl lithium, n-propyl lithium, iso-propyl lithium, n-butyl lithium, secondary butyl lithium, tert-butyl lithium, phenyl lithium, benzyl lithium and a living conjugated diene polymer having an active lithium.

5. A process according to claim 1, wherein the monomeric silyl hydride is selected from the group consisting of methyl dichlorosilane, ethyl dichlorosilane, propyl dichlorosilane, butyl dichlorosilane, phenyl dichlorosilane, dimethyl chlorosilane, diethyl chlorosilane, dipropyl chlorosilane, dibutyl chlorosilane, diphenyl chlorosilane, dimethyl methoxy silane, dimethyl ethoxy silane, dimethyl propoxy silane, dimethyl butoxy silane, dimethyl benzoxy silane, diethyl ethoxy silane, diethyl ethoxy silane, diethyl propoxy silane, diethyl butoxy silane, diethyl benzoxy silane, dipropyl methoxy silane, dipropyl ethoxy silane, dipropyl propoxy silane, dipropyl butoxy silane, dipropyl benzoxy silane, dibutyl methoxy silane, dibutyl ethoxy silane, dibutyl propoxy silane, dibutyl butoxy silane, dibutyl benzoxy silane, diphenyl methoxy silane, diphenyl ethoxy silane, diphenyl propoxy silane, diphenyl butoxy silane, diphenyl benzoxy silane, dimethylsilane, diethylsilane, dipropyl silane, dibutylsilane, diphyenylsilane, diphcnylmethylsilane, diphenylethylsilane, diphenylpropylsilane, dipheniylbutylsilane, trimethylsilane, triethylsilane, tripropylsilane, tributylsilane, triphenylsilane, methylsilane, ethylsilane, propylsilane, butylsilane, phenylsilane and methyldiacetoxysilane.

6. A process according to claim 1, wherein the polymeric silyl hydride is selected from the group consisting of polymethylhydrosiloxane, polyethylhydrosiloxane, polypropylhydrosiloxane, polybutylhydrosiloxane, polyphenylhydrosiloxane and 1,1,3,3-tetramethyldisiloxane.

7. A process according to claim 1, wherein the cyclic silyl hydride is selected from the group consisting of methylhydrocyclosiloxane, ethyllhydrocyclosiloxane, propylhydrocyclosiloxane, butylhydro-cyclosiloxane, and phenylhydrocyclosiloxane.

8. A process according to claim 1, wherein the silazan is selected from the group consisting of 1,1,3,3 tetramethyldisilazan, 1,1,3,3 tetraethyldisilazan, 1,1,3,3 tetrampropyldisilazan, 1,1,3,3 tetrabutyldisilazan, and 1,1,3,3 tetraphenyldisilazan.

9. A process according to claim 1, wherein said polymer has a number average molecular weight of 500 to 1,000,000.

10. A process according to claim 1, wherein said polymer is a homopolymer or a copolymer consisting essentially of 1,3-butadiene and/or isoprene.

11. A process according to claim 10, wherein said polymer is a block copolymer containing at least one polymer block A, which consists essentially of styrene, and at least one polymer block B which consists essentially of 1,3-butadiene and/or isoprene, and the content of block A in the block copolymer is within 0 to 90% by weight and the 1,2-vinyl contents in the block B is within 6% to 80% by weight.

12. Process according to claim 1, wherein the titanium compound is present in an amount of from 0.001 millimoles to 20 millimoles per 100 g of said polymer.

13. A process according to claim 1, wherein the mole ratio of silyl hydride (b) to titanium compound (a) is from 0.01/1 to 200/1.

14. A process according to claim 1, wherein the mole ratio of metallic compound (c) to titanium compound (a) is from 0/1 to 100/1.

15. A process according to claim 1, wherein the metallic compound (c) is selected from the group consisting of an organolithium compound and an organomagnesium compound.

* * * * *